United States Patent [19]

Schwab et al.

[11] Patent Number: 5,424,746

[45] Date of Patent: Jun. 13, 1995

[54] METHOD AND SYSTEM FOR MONITORING VEHICLES

[75] Inventors: Carl E. Schwab, Huntington Station, N.Y.; Fred N. S. Goodrich, Barnstead, N.H.

[73] Assignee: Cardion, Inc., Woodbury, N.Y.

[21] Appl. No.: 153,257

[22] Filed: Nov. 16, 1993

[51] Int. Cl.[6] ............... G01S 13/80; G01S 13/06
[52] U.S. Cl. ......................... 342/49; 342/46; 342/169; 342/463
[58] Field of Search ............. 342/30, 36, 37, 43, 342/45, 46, 49, 59, 169, 399, 444, 453, 454, 463, 465

[56] References Cited

U.S. PATENT DOCUMENTS

| 3,706,992 | 12/1972 | Brisse et al. | 342/51 |
|---|---|---|---|
| 3,905,035 | 9/1975 | Krumboltz et al. | 342/14 |
| 3,950,753 | 4/1976 | Chisholm | 342/399 |
| 3,969,725 | 7/1976 | Couvillon et al. | 342/47 |
| 3,997,898 | 12/1976 | LeGrand | 342/35 |
| 4,010,465 | 3/1977 | Dodington et al. | 342/35 |
| 4,128,839 | 12/1978 | McComas | 342/32 |
| 4,143,376 | 3/1979 | Jezo | 342/49 |
| 4,191,958 | 3/1980 | Hulland et al. | 342/396 |
| 4,385,300 | 5/1983 | Prill et al. | 342/399 |
| 4,532,516 | 7/1985 | Frampton et al. | 342/47 |
| 4,677,439 | 6/1987 | Skzypczak | 342/47 |
| 4,680,587 | 7/1987 | Chisholm | 342/33 |
| 4,688,046 | 8/1987 | Schwab | 342/456 |
| 5,144,315 | 9/1992 | Schwab et al. | 342/49 |
| 5,262,784 | 11/1993 | Drobnicki et al. | 342/45 |

Primary Examiner—Daniel T. Pihulic
Attorney, Agent, or Firm—Lawrence C. Edelman

[57] ABSTRACT

System for tracking a vehicle equipped with a transponder which emits a first reply signal containing data identifying the vehicle in response to a first interrogation signal and emits a second reply signal containing data specifying the altitude of the vehicle in response to a second interrogation signal, the system including: (a) a squitter transmitter located on the vehicle for interrogating the transponder with the first and the second interrogation signals which are separated in time by a predetermined time spacing interval, in response to which first and second interrogation signals, the transponder transmits the first and second reply signals; (b) a plurality of spaced apart ground receive stations, each of which includes a receiver and decoder for: (i) receiving and decoding data from the first and second reply signals, (ii) determining a time of arrival of the first and second reply signals and the predetermined time spacing interval, and (iii) determining an identity of the vehicle by combining data from the first reply signal with information derived from the predetermined time spacing interval; (c) a communications link for connecting the ground receive stations with one of the ground receive stations; and (d) a computer at the one of the ground receive stations for receiving information from the other ground receive stations over the communication link, the information including the identity and time of arrival data determined from the time of arrival of the first and second reply signals, and for calculating the position of the vehicle from the time of arrival data.

18 Claims, 4 Drawing Sheets

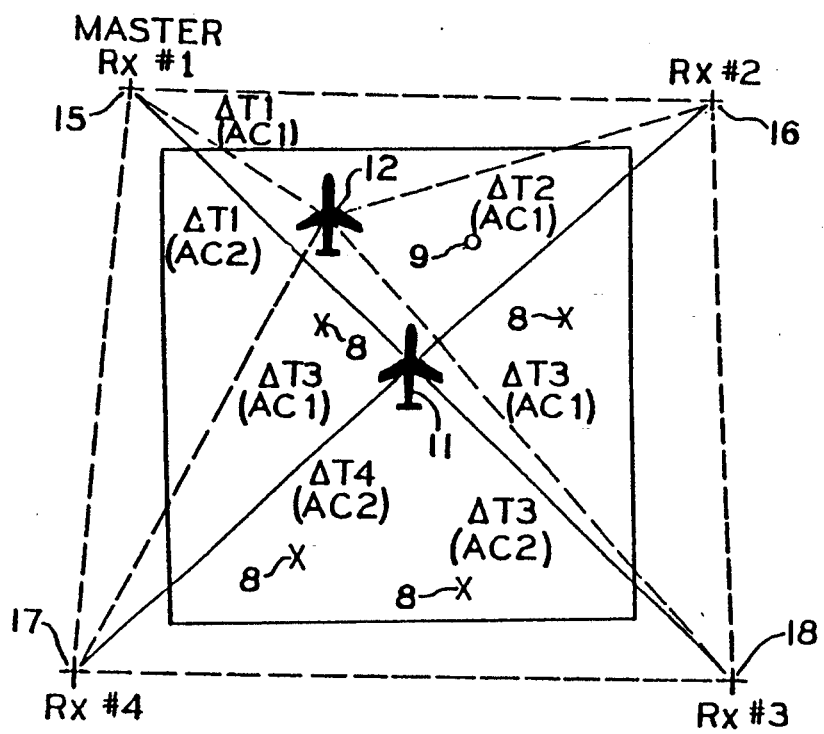
FIG_1
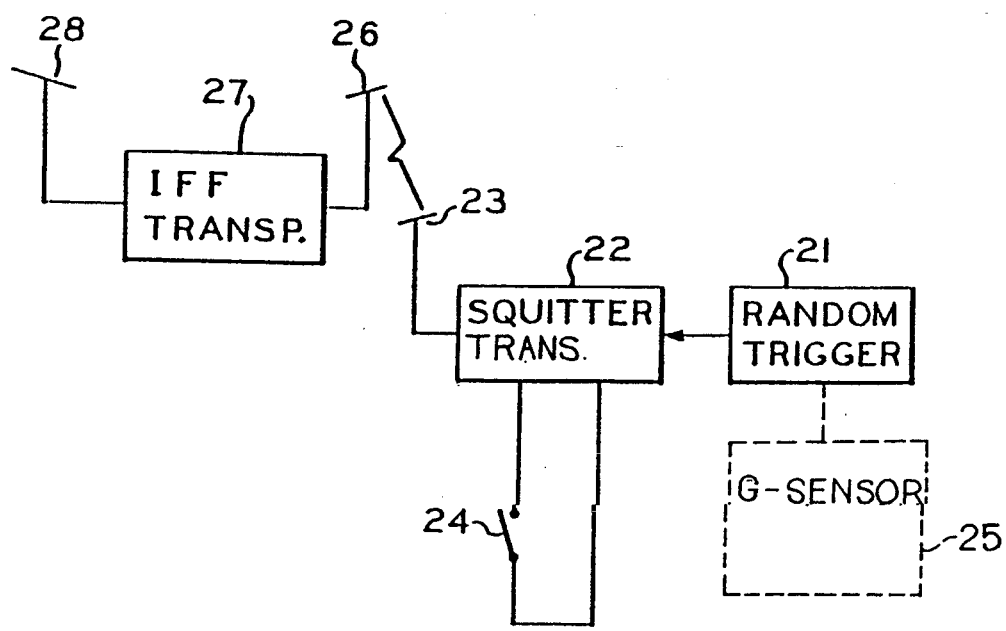
FIG_2

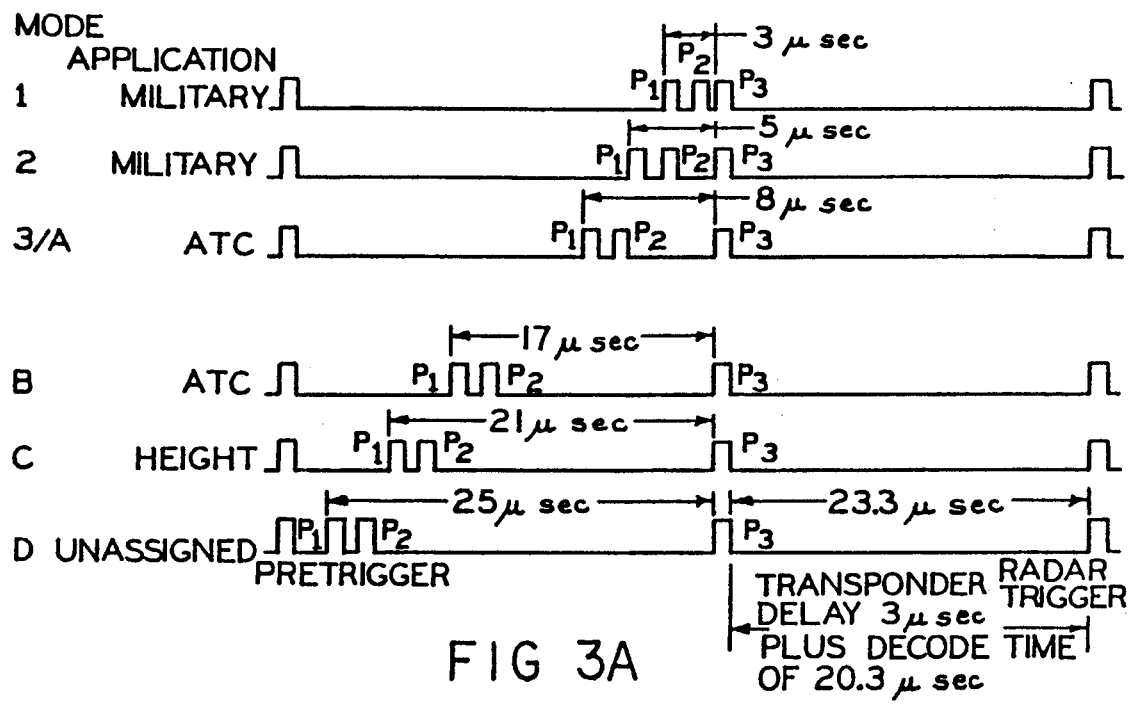
FIG 3A
TRANSPONDER REPLY CODES
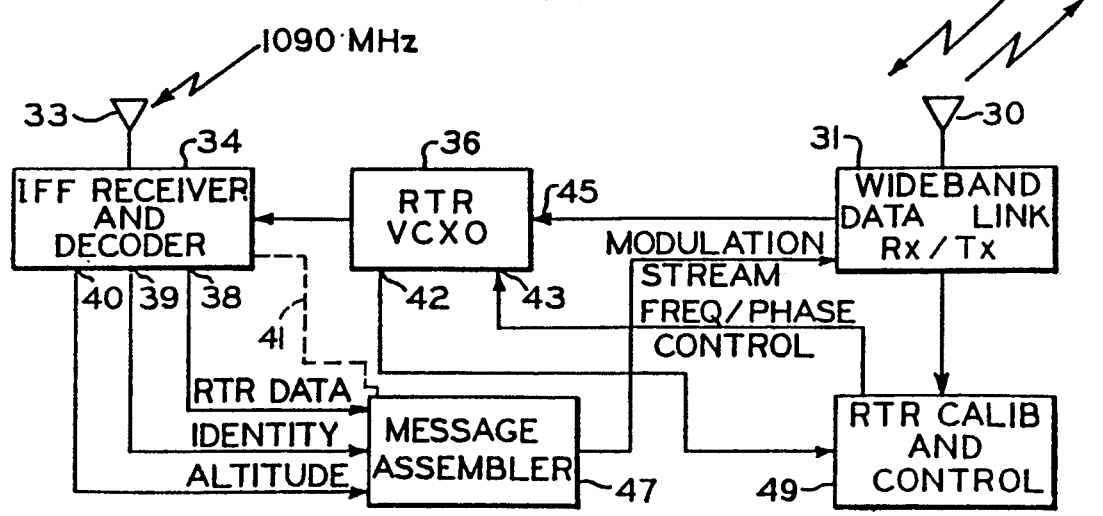
FIG 3B
FIG 4

METHOD AND SYSTEM FOR MONITORING VEHICLES

TECHNICAL FIELD OF THE INVENTION

The present invention relates to a method and system for monitoring vehicles and, in particular, to a method and system for determining the position of aircraft and other vehicles over a test range.

BACKGROUND OF THE INVENTION

To train combat pilots effectively, training flights are conducted over a test range which includes simulated missile defense systems. These simulated missile defense systems include radar beacons which simulate fire control radar of missile defense systems. In order to evaluate a pilots performance during such training, it is necessary to monitor accurately the position of the aircraft as it travels through the test range.

U.S. Pat. No. 5,144,315, issued Sep. 1, 1992, entitled "System for Accurately Monitoring Aircraft Position During Training Exercises" (the '315 patent), discloses a system in which a conventional airborne IFF transponder located on board an aircraft is used as a source of tracking data. Emissions from the airborne IFF transponder are used in an inverse Loran position determining system for establishing longitudinal and latitudinal coordinates for the aircraft. In the inverse Loran positioning system, a plurality of ground receive stations are positioned around a test range. An aircraft flying through the test range includes a squitter transmitter which interrogates a conventional airborne IFF transponder. In response to the interrogation, the transponder transmits its altitude and identity on a continuous basis to ground receive stations in the test range. The ground receive stations have accurate clocks which are synchronized with each other and which are used to note the time of arrival of transmissions received from the airborne IFF transponder.

In the system disclosed in the '315 patent, each of the ground receive stations is linked to a master ground receive station through a wide-band, two-way data link. The two-way data link enables the master ground receive station to calibrate clocks at remote ground receive stations as well as to receive data from the remote ground receive stations identifying time of arrival of transponder transmissions emitted from aircraft passing through the test range. Using well known Loran techniques, the master ground receive station calculates X-Y coordinates for the aircraft using the time of arrival information received from the remote ground receive stations. Additionally, altitude information which is transmitted from the IFF transponders is used to monitor the altitude of the aircraft.

As taught by the '315 patent, an aircraft need only include a squitter transmitter for interrogating a standard IFF transponder on the aircraft. Further, the squitter transmitter may be configured to interrogate the IFF transponder on an asynchronous basis to reduce the possibility of transmission collisions with transmissions from other aircraft transponders in the general vicinity. As further taught by the '315 patent, an accelerometer signal representing aircraft performance (for example, changes in flight path) may be used to modify the squitter transmitter average interrogation rate. The resultant change in average reply rate of the IFF transponder may be used by the ground receive stations and the master ground receive station to position accurately ground tracking stations or illuminators in light of the changes. As still further taught by the '315 patent, it is possible to cross-link a TACAN interrogating system on the aircraft with the IFF transponder. In such embodiments, transmission of a TACAN pulse is used to initiate interrogation of the aircraft IFF transponder. In this case, each of the ground receive stations receives the TACAN pulse as well as the IFF transponder signal containing altitude data. If each aircraft is assigned a TACAN frequency, the altitude and TACAN frequency may be correlated to provide the identity of the aircraft.

The '315 patent teaches the use of two types of interrogation pulses which are spaced at a fixed distance from one another in time. The IFF transponder emits a signal which provides an identification in response to the first type of interrogation pulse and emits a signal which provides an altitude in response to the second type of signal. However, in accordance with standard IFF transponder reply codes, 12 bits are available for use in providing identification information. In certain applications, the use of 12 bits limits the number of aircraft that can be identified.

In light of the above, there is a need in the art for a method and apparatus for monitoring the position of vehicles such as aircraft and/or ground vehicles in the area of a test range which has a greater capacity for identification than is provided by the typical IFF transponder reply code.

SUMMARY OF THE INVENTION

Advantageously, embodiments of the present invention are method and apparatus for monitoring the position of vehicles such as aircraft and/or ground vehicles in the area of a test range which has a greater capacity for identification than is provided by the typical IFF transponder reply code.

In particular, an embodiment of the present invention is a system for determining positions of a vehicle equipped with a transponder which emits a first reply signal containing data identifying the vehicle in response to a first interrogation signal and which emits a second reply signal containing data specifying the altitude of the vehicle in response to a second interrogation signal, the system comprising: (a) a squitter transmitter located on the vehicle for interrogating the transponder with the first and the second interrogation signals which are separated in time by a predetermined time spacing interval, in response to which first and second interrogation signals, the transponder transmits the first and second reply signals; (b) a plurality of spaced apart ground receive stations, each of which comprises means for: (i) receiving and decoding data from the first and second reply signals, (ii) determining a time of arrival of the first and second reply signals and the predetermined time spacing interval, and (iii) determining an identity of the vehicle by combining data from the first reply signal with information derived from the predetermined time spacing interval; (c) a communications link connecting the ground receive stations with one of the ground receive stations; and (d) means at the one of the ground receive stations for receiving information from the other ground receive stations over the communication link, the information comprising the identity and time of arrival data determined from the time of arrival of the first and second reply signals, and for calculating the position of the vehicle from the time of arrival data.

BRIEF DESCRIPTION OF THE FIGURE

FIG. 1 shows a system disposed over a test range, which system determines the position of aircraft over the test range during training;

FIG. 2 shows a block diagram of on board aircraft equipment which enables an IFF transponder to serve as a radio beacon for tracking the aircraft in accordance with the present invention;

FIG. 3A shows interrogation modes available in standard IFF transponder equipment;

FIG. 3B shows transponder reply codes which are generated in response to interrogation pulses;

FIG. 4 shows a block diagram of a ground receive station used to obtain time of arrival, identity and altitude information from aircraft in accordance with the present invention;

DETAILED DESCRIPTION

Figure 5:
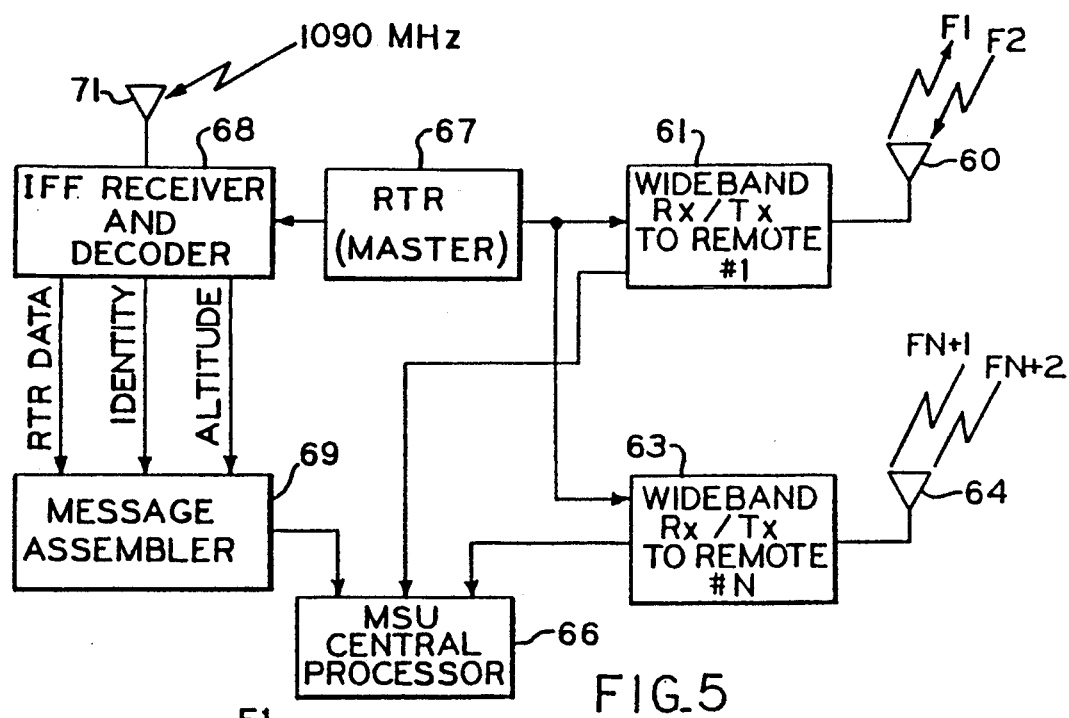
FIG. 5 shows a block diagram of a master ground receive station used in accordance with the present invention.

The following describes improvements to the methods and apparatus disclosed in the '315 patent, which improvements greatly expand the ability of those methods and apparatus to identify vehicles in areas such as test ranges.

FIG. 1 shows an aircraft test range whose boundaries form a quadrilateral, the corners of the quadrilateral include ground receive stations 15, 16, 17 and 18, respectively. Ground receive station 15 is a master ground receive station which collects data from the other ground receive stations by, for example, a two-way communications link (represented by the perimeter dashed line). The aircraft test range also includes several ground radar simulating sources 8. As shown in FIG. 1, aircraft 11 and 12 fly against the radar simulating sources to practice evasive maneuvers.

In accordance with the present invention, on board transponder equipment such as, for example, conventional IFF transponders, are interrogated by squitter transmitters also located on board aircraft 11 and 12. In response to interrogation from the squitter transmitter on board the aircraft, the interrogated IFF transponder transmits signals comprising altitude and identification information for the aircraft.

Further in accordance with the present invention, each of ground receive stations 16–18 includes a local clock which is synchronized with a clock at master ground receive station 15. The clocks are used to determine the time of arrival of the transponder signals at ground receive stations 15–18. The time of arrival information obtained at receive ground stations 16–18 are transmitted to master ground receive station 15 via the two-way communication links. As is known from conventional Loran principles, the time of arrival of a signal from an aircraft at a minimum of three (3) ground receive stations can be used to determine the location of the aircraft in longitude and latitude.

Still further in accordance with the present invention, master ground receive station 15 includes a computer which builds a table of time of arrival measurements for each of ground receive stations 15–18 as an aircraft flies through the aircraft test range. Master ground receive station 15 uses this information to determine the aircraft position when it is over the test range. Since the on board IFF transponder transmits an altitude measurement as part of its reply to the interrogation pulse from the squitter transmitter as well as the aircraft identity, the longitude, latitude, and the altitude of the aircraft are all available for use in assessing the training exercise.

As disclosed in the '315 patent, the squitter transmitter 22 and trigger 21 which interrogates the IFF transponder on the aircraft may interrogate the IFF transponder at periodic intervals and may be fastened to an aircraft strut or weapon holder and also receive power from the aircraft by well known conventional means.

FIG. 2 shows the equipment carried by an aircraft for emitting standard IFF signals in accordance with the present invention. Random trigger 21 applies an output to squitter transmitter 22 on a random basis. In response, squitter transmitter 22 produces standard interrogation pulses such as those shown in FIG. 3A, on a random basis, which interrogation pulses are applied as input to IFF transponder 27. By randomizing the interrogation of IFF transponder 27, collision of signals emitted by IFF transponder 27 with signals emitted from other aircraft in the vicinity of the aircraft of interest is avoided. As further shown in FIG. 2, squitter transmitter 22 includes antenna 23 for radiating to antenna 26 of IFF transponder 27.

FIG. 3A shows standard IFF transponder interrogation pulses that are well known to those of ordinary skill in the art and FIG. 3B shows standard transponder reply codes that are also well known to those of ordinary skill in the art.

As is well known, whenever squitter transmitter 22 emits mode A interrogation pulses shown in FIG. 3A, IFF transponder 27 will emit a reply signal which indicates the identity of the aircraft. Further, whenever squitter transmitter 22 emits mode C interrogation pulses shown in FIG. 3A, IFF transponder 27 will emit a reply signal which indicates the altitude of the aircraft. As disclosed in the '315 patent, squitter transmitter 22 is configured to emit mode C interrogation pulses 125 microseconds after having emitted the mode A interrogation pulses. Then, in accordance with the teaching of the '315 patent, ground receive stations 15–18 collect and correlate the emitted identity information from mode A interrogation and altitude information from mode C interrogation and the data is received in a constant 125 microsecond interval, enabling the ground receive stations to correlate the aircraft identity with its altitude.

I have discovered that the methods and apparatus disclosed in the '315 patent can be improved upon by making the following changes. Instead of providing a uniform spacing interval of, for example, 125 microseconds between providing mode A and mode C interrogation pulses as taught by the '315 patent, the spacing interval between mode A and mode C interrogation pulses is assigned to different values. The improvement that occurs in assigning a different value for the spacing interval between mode A and mode C interrogation pulses is the ability to use the spacing interval to provide additional identification capabilities for aircraft as well as other vehicles. As an example, ground vehicles could be assigned a spacing interval of 165 microseconds and aircraft could be assigned a spacing interval of 175 microseconds. Further, experimental data used to test this principle shows that as little as 1 microsecond can be used to separate identification groups to provide, for example 11 classes, by providing spacing intervals of 165, 166, . . . , 174, and 175 microseconds. The use of different spacing intervals to enhance identification expands the number of vehicles that can be identified a great deal since the standard transponder reply codes shown in FIG. 3B provide only 12 bits for identification information. Further, in accordance with the present invention, for a class of vehicle that has no meaningful altitude, the spacing interval could be set to a unique value and the paired transmissions (replies to mode A and mode C interrogation pulses) can be used to provide 24 bits of identification information rather than the 12 bits of identification information and 12 bits of altitude information emitted in response to the mode A and mode C interrogation. Still further, in a preferred embodiment of the present invention, the average rate of the randomized transmission can be set to serve the group of vehicles identified by the particular spacing interval chosen.

As further described in the '315 patent, and as shown in FIG. 2, squitter transmitter 22 may include a disable switch 22 connected to squitter transmitter 22. Disable switch 24 is enabled once the aircraft has returned to the ground to disable squittering of IFF transponder 27 until another flight commences. Switch 24 may be connected to the landing gear of the aircraft and operated whenever the aircraft is on the ground. Further, squitter transmitter 22 may be keyed at a rate proportional to a signal from an accelerometer (G) sensor mounted on the aircraft, or with a G-sensor package 25. The average rate of interrogation pulses may increase as the aircraft experiences changes in flight path. The ground receive stations can decode the rate of received replies and derive a signal representing changes in aircraft flight path. As was stated in the '315 patent, the advantage of using G-sensor 25 is in obtaining useful position information that can be used to position ground radar or ground based tracking systems. The interrogation pulse rate may be changed linearly with increases in acceleration—the accelerometer can be implemented to sense any of three directions of movement, lateral, pitch, or yaw (lateral motion sensing being preferred). If the interrogation rate occurs at a nominal periodic rate of 50,000 microseconds, the accelerometer signal can increase this rate linearly. The ground receive stations can decode this change in the nominal periodic rate to derive information relating to the aircraft flight path changes. Additionally, the change in interrogation rate in response to acceleration will increase the total number of aircraft that can be simultaneously tracked because some percentage of the aircraft are in a high acceleration mode while most aircraft are in a normal G condition.

A block diagram of remote ground receive stations 16–18 is shown in FIG. 4. As shown in FIG. 4, a ground receive station includes wide band data link transmit/receive station 31 connected to microwave antenna 30 which is positioned to communicate with master ground receive station 15. The wide band data link enables synchronization of local clocks 36 at each of remote ground receive stations 16–18 with a master clock at master ground receive station 15. Additionally, the recovered reply data from the IFF transponders and time of arrival information is transmitted back to master ground receive station 15 over the wide band data link.

Although the wide band data link is shown to be a wide band microwave data link, those of ordinary skill in the art understand that the present invention is not limited to such an embodiment and that, in accordance with the present invention, the wide band data link could also be embodied as a fiber distributed data interface, a token ring data highway, and so forth.

Reply signals emitted by IFF transponder 27 are received by antenna 33 at the conventional IFF reply frequency of 1090 MHz. IFF receiver and decoder 34 provide for three different quantities of data. The conventional identity and altitude data transmitted as part of the mode interrogation of IFF transponder 27 is decoded and the altitude data is supplied to output port 40. The time of arrival of the altitude or identity information is determined for each transmission of the transponder reply and the time of arrival data appears at output port 38.

The time of arrival data is the time noted by IFF receiver 34 when the framing pulses of a reply are received. A counter within IFF receiver 34, which counter is under control of real time clock 36, notes the occurrence of each pulse event received and is cleared following the successful decode of both identity and altitude information. Thus, a time of arrival for the pulse train may be computed based on a running average of framing pulse arrivals or on the arrival of any of the identity or altitude data, as selected by the system designer. Further, in accordance with one aspect of the present invention, the time of arrival between the replies to the mode A and mode C interrogations are determined and converted to an additional piece of identity information by, for example, comparison to information stored in a table. This additional piece of identification information is combined with the conventional identity provided by the IFF transponder reply and the combined identification information is supplied to output port 39. As further shown in FIG. 4, output port 41 provides a signal which represents the average periodic rate of time of arrival of the IFF reply and corresponds to the signal produced by an accelerometer on the aircraft. This signal may be used to obtain accurate position change information for the aircraft.

Message assembler 47 composes the real time arrival data, identity data and altitude data, and if available, the decoded accelerometer signal, into a message for modulating on the carrier signal of the wide band communication link. The wide band communication link station 31 will receive this modulation stream and transmit it to master ground receive station 15.

In order for master ground receive station 15 to receive correlated time of arrival data for each of ground receive stations 16–18, it is necessary that real time clock 36 at each of the ground receive stations be in synchronism. Thus, during a calibration sequence, the wide band data link will provide calibration data from master ground receive station 15 which is used to synchronize clock 36 at each ground receive station so that time of arrival data from each receiver is synchronized with that from each other receiver. A real time clock calibration and control network 49 suitable for this purpose is described in the '315 patent and that description is incorporated by reference herein. The real time clock calibration and control network 49 is used during a calibration interval to receive clock data from the wide band data link, decode the same and provide frequency/phase control signal 43 to real time clock 36, which frequency/phase control signal is the result of comparing the actual time of real clock 36 via output port 42 with a received real time from master ground receive station 15. Further, embodiments of the present invention also can utilize other methods of calibrating clocks such as using a calibration transponder described in the '315 patent, which description is also incorporated by reference herein.

FIG. 5 shows master ground receive station 15. As shown in FIG. 5, IFF receiver 68, connected to IFF antenna 71 receives time of arrival data, and identity and altitude information from transponder replies. IFF receiver and decoder 68 and message assembler 69 operate in the same manner described above with respect to IFF receiver and decoder 34 and message assembler 47 shown in FIG. 4. Message assembler 69 arranges the message in a format which can be delivered to central processor 66. Similar messages are received from the remote ground receive stations 16–18 via individual data links. A wide band data link comprising transmit/receive station 61 is used to communicate with the first remote ground receive station and additional data link stations 63 communicate with the remaining remote ground receive stations.

Central processor 66 collects an assembled data package from each of the remote ground receive stations. If the squitter transmitter interrogation rate is varied in accordance with a sensor signal, this information is provided as well. Central processor 66 is a general purpose digital computer which includes a table for each ground receive station, storing the most recent packet of received position and identity data received from each ground receive station. Thus, four tables are built within central processor 66 which contain the identity and corresponding altitude and time of arrival data for each aircraft in the test range. These tables maintain time of arrival data for more than one aircraft since each time of arrival is correlated with each aircraft identity. In accordance with the present invention, as was described above, the identity of an aircraft is determined as a combination of IFF transponder identification emitted in reply to the interrogation pulses from the on board squitter transmitters and the spacing between the time of arrival of the IFF transponder reply to mode A and mode C interrogation pulses from the on board squitter transmitter.

It is also possible to include a computer program which will calculate aircraft heading and ground speed from the position coordinates which are continuously calculated from time of arrival information. Thus, using change in position data both the related air speed and bearing may be calculated.

As those familiar with Loran technology will appreciate, latitude and longitude may be computed from time of arrival data received at three ground receive stations. The fourth time of arrival data can be used to permit a series of calculations to be performed among combinations of three ground receive stations. Any errors in data can be discarded in favor of the three most correlated calculations for longitude and latitude position determination. Reporting of the position coordinates for aircraft in the test range can be sent by telephone link or displayed locally in any convenient manner.

Figure 6:
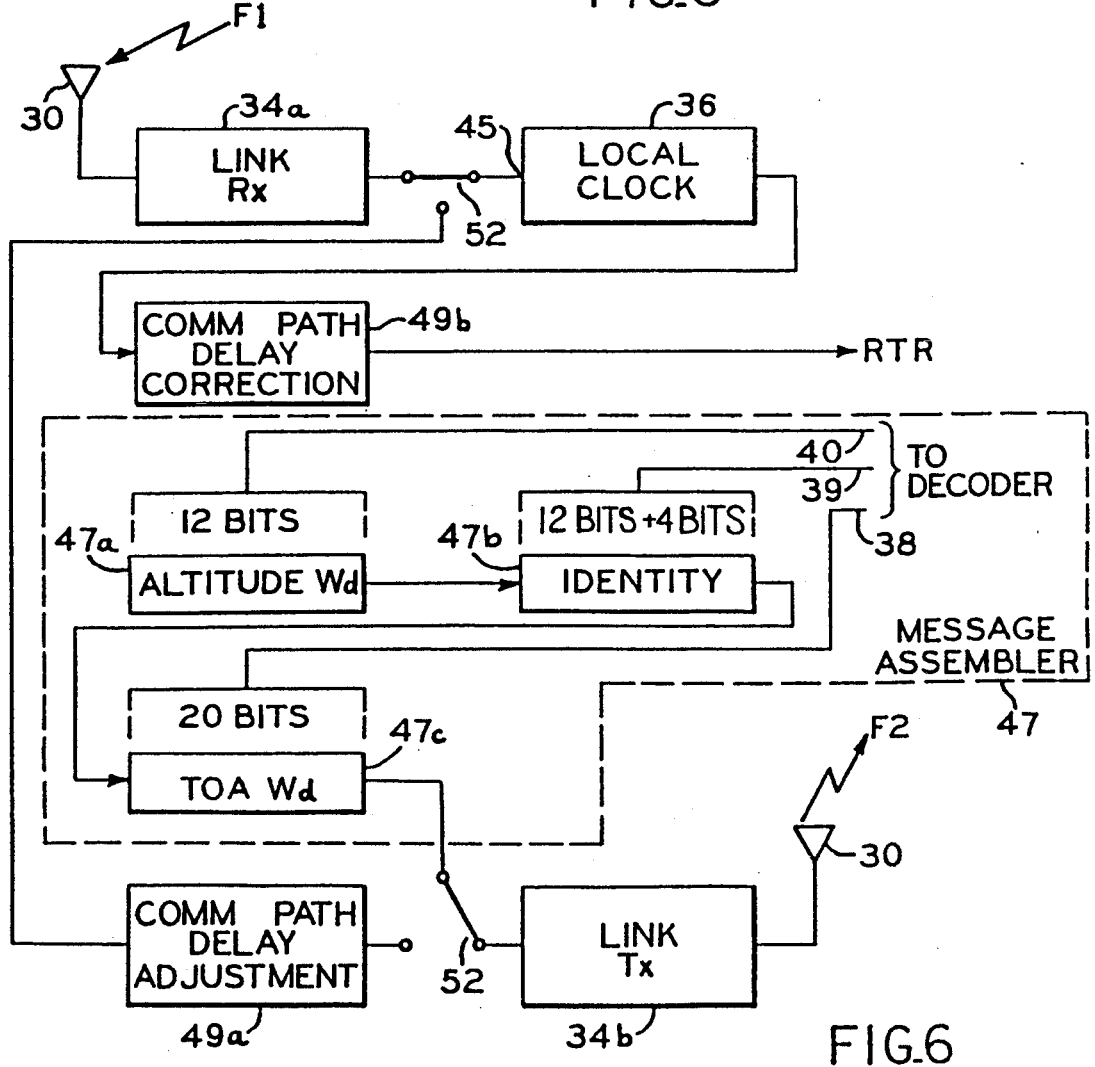
FIG. 6 shows a block diagram of a message assembler in a ground receive station fabricated in accordance with the present invention.

FIG. 6 shows a block diagram of further detail of a ground receive station. Each of the ground receive stations have local clocks 36 calibrated so that the time of arrival of transponder replies will be loaded in a corresponding register 47c at each station. This time of arrival data may be typically as much as 20 bits wide and include the entire pair of replies, altitude and identity. The time of arrival may be measured against any of the reply bits which are in the register 47c. The identity in register 47b includes the 12 bits from the IFF transponder reply as well as, for example, 4 bits determined by the spacing interval between the mode A and mode C interrogation.

The calibration of each of the ground receive stations requires only that the clocks at each receive station be synchronized. RTR master clock 67 in master ground receive station 15, shown in FIG. 5, can be transmitted to each of remote ground receive stations 16–18 over data links represented by transmit/receive stations 61 through 63. It is well known to those of ordinary skill in the art that to achieve accurate synchronism between remotely located clocks and master clock 67, calibration is required at each ground receive station to compensate path delay experienced by transmission of clock information from the master station to each of the ground receive stations. As stated above, such a calibration method and apparatus are described in the '315 patent. As further described in the '315 patent, an alternative method for calibrating the clocks in the remote ground receive stations utilizes a calibration transponder. Calibration transponder 9 is shown in FIG. 1 to be located within the test range. Calibration transponder is operated in a squitter mode, preferably at a lower squitter rate such as 1 transmission per second, emitting both an identity and altitude transmission, which transmissions are received by each of the ground receive stations 15–18. The distances between each of the ground receive stations and transponder 9 is known precisely. Each receive station notes the time of arrival using its internal receive clock just as it does when tracking aircraft through the test range. The time of arrival for these transmissions is reported to the master ground receive station and, since the distances from the transponder to each of the ground receive stations is known, an expected time of arrival for each of these distances is also known. The computer at the master ground receive station compares the expected time of arrival data with actual time of arrival data. Then, the computer at the master ground receive station can compute clock offset corrections for each ground receive station real time clock, and modify subsequent time of arrival information received from a target aircraft. This technique for calibrating the receive clocks is advantageous for several reasons: First, this calibration technique does not require an outgoing data link from the master ground receive station to each of the other ground receive stations. Second, this calibration technique permits verification of the tracking system operation before in-flight measurements begin. Third, one does not need to utilize a wideband data link to send data from the remote ground receive stations to the master. Instead, one can utilize a low speed data link such as, for example, a telephone link.

Figure 7:
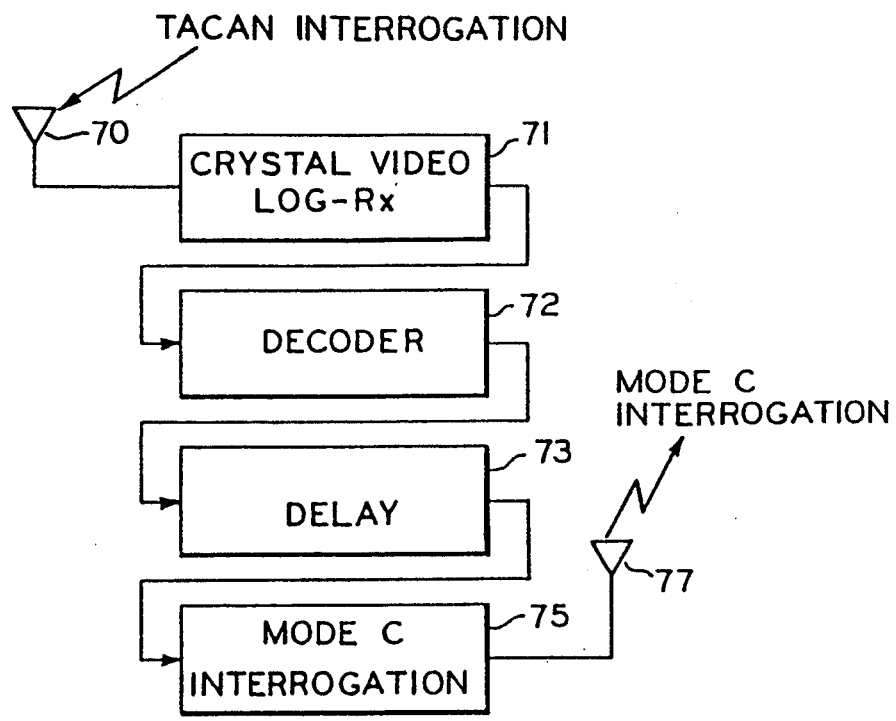
FIG. 7 shows a block diagram of on board aircraft equipment which uses a TACAN and IFF cross-linked transponder in accordance with an alternative embodiment of the present invention.

An alternative embodiment of the present invention is useful in aircraft such as many military aircraft which have both IFF transponder and TACAN navigation equipment. In the alternative embodiment, as shown in FIG. 7, a cross-link circuit may be used so that TACAN interrogations emitted on the aircraft are used to interrogate the IFF transponder on the aircraft. As further shown in FIG. 7, crystal detector 71 is connected to small receiving antenna 70. TACAN interrogation pulses which are RF pulses of several hundred watt magnitude are received by detector 71. The resulting pulse from detector 71 is decoded in decoder 72. A delayed pulse provided by delay circuit 73 is used to initiate a mode C interrogation from a transmitter 75. Mode C interrogation can be perfected in response to the TACAN pulse and is supplied through antenna 77 as in the previous embodiment to interrogate the IFF transponder. Using the TACAN interrogation pulses to trigger a mode C interrogation provides an ability to identify transponder replies to the mode C interrogation without requiring a mode 1, 2, or 3 interrogation of the IFF transmitter. In accordance with the principles of the present invention, further identification information is provided by varying the spacing interval between the TACAN signal and the mode C interrogation by varying the delay produced by delay 73.

Figure 8:
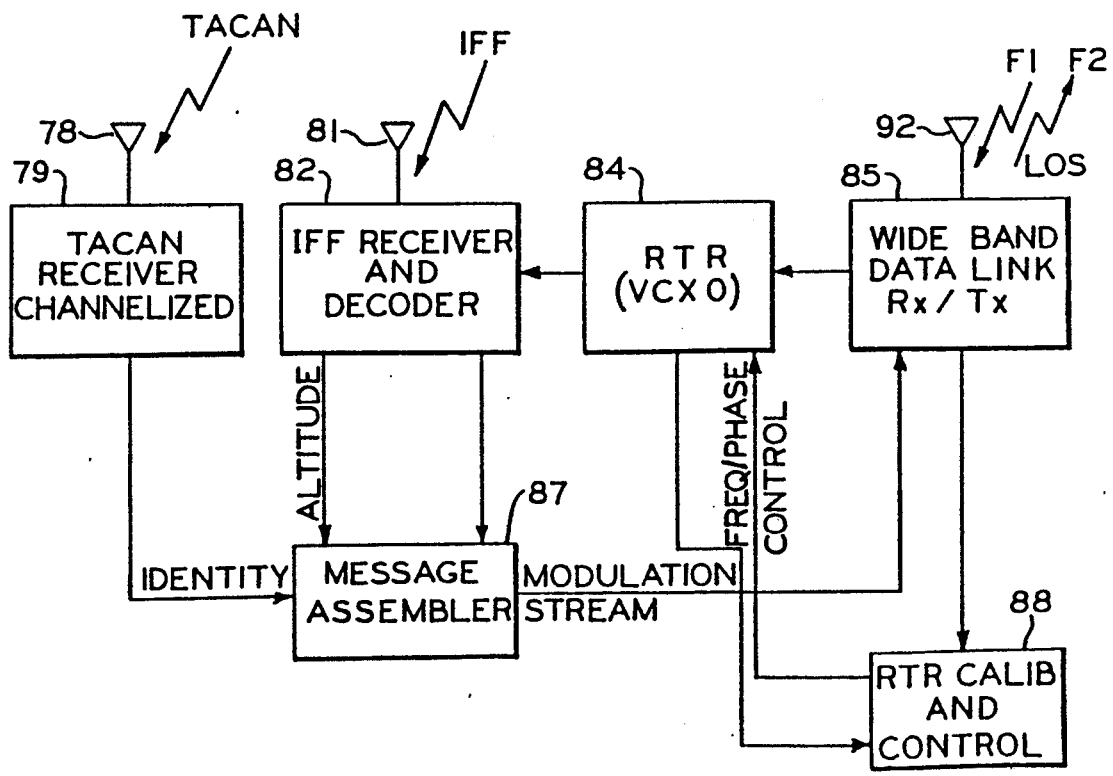
FIG. 8 shows a block diagram of a ground receive station for use in the alternative embodiment of the present invention.

As shown in FIG. 8, the remote ground receive stations can include a TACAN receiver 79 as well as an IFF receiver 82. The particular channel of the TACAN receiver which receives a TACAN inquiry correlated with an IFF reply received at the ground receive station can be used to identify the aircraft. Since the TACAN inquiry initiates the IFF reply, they are time correlated, permitting the remote receiving site to correlate altitude with identity.

At the remote ground receive station, TACAN antenna 78 supplies each received TACAN pulse to TACAN receiver 79. Depending on the frequency of the TACAN pulse, the aircraft is identified at a first level in accordance with a preassigned TACAN frequency. Further, in accordance with an aspect of the present invention, the time of arrival of the TACAN pulse and the IFF transponder reply are used to add to the identification information provide by the TACAN frequency in the manner described above.

IFF antenna 81 at the ground receive station is connected to the IFF receiver and decoder. The altitude and time of arrival information is once again compiled by message assembler 87. Real time clock 84 is calibrated with calibration and control circuitry 88 as previously described. A wide band data link is provided by data station 85 and calibration and modulated position data is transmitted via wide band data link station 85 back to the master ground receive.

Those of ordinary skill in the art will recognize that if one of the ground receive stations is positioned, in elevation, higher than the others, it is possible to locate the altitude of the aircraft using time of arrival methods. Thus, as a cross-check against altitude measurements from an IFF transponder, or as an independent calculation of altitude, the differences in elevation of each ground receive station, not only can longitudinal and latitudinal position coordinates to be derived, but elevation coordinates can be derived as well.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. Thus, it is to be understood that the claims appended hereto are intended to cover all such modification and variations which fall within the true scope and spirit of the invention. Embodiments of the present invention has applicability to other systems, both military and non-military. An example of such other applications includes airport surveillance and/or tracking of ground vehicles (and aircraft) as well as flying aircraft, including their longitude and latitude coordinates.

What is claimed is:

1. A system for determining positions of a vehicle equipped with a transponder which emits a first reply signal containing data identifying the vehicle in response to a first interrogation signal and which emits a second reply signal containing data specifying the altitude of the vehicle in response to a second interrogation signal, the system comprising:

a squitter transmitter located on the vehicle for interrogating the transponder with the first and the second interrogation signals which are separated in time by a predetermined time spacing interval, in response to which first and second interrogation signals, the transponder transmits the first and second reply signals;

a plurality of spaced apart ground receive stations, each of which ground receive stations comprises means for:
   (a) receiving and decoding data from the first and second reply signals,
   (b) determining a time of arrival of the first and second reply signals and the predetermined time spacing interval, and
   (c) determining an identity of the vehicle by combining data from the first reply signal with information derived from the predetermined time spacing interval;

a communications link connecting the ground receive stations with one of the ground receive stations; and means, at the one of the ground receive stations, for receiving information from the other ground receive stations over the communication link, the information comprising the identity and time of arrival data determined from the time of arrival of the first and second reply signals, and for calculating from the time of arrival data the position of the vehicle.

2. The system of claim 1 wherein the means at the one of the ground receive stations for calculating comprises means for calculating speed and heading of the vehicle.

3. The system of claim 1 further comprising a plurality of spaced apart simulated ground radar signals against which the vehicle can conduct evasive maneuvers.

4. The system of claim 1 wherein the means at the one of the ground receive stations for calculating comprises a digital computer.

5. The system of claim 1 wherein the communication link comprises a two-way communications link between the one of the ground receive stations and the other ones of the ground receive stations.

6. The system of claim 5 wherein the one of the ground receive stations distributes real time clock synchronization data over the communications link to the other ones of the ground receive stations.

7. The system of claim 1 wherein the vehicle is an aircraft and wherein the system further comprises a disabling switch coupled to landing gear of the aircraft for disabling transmissions from the squitter transmitter when the aircraft is on the ground.

8. The system of claim 1 wherein the squitter transmitter is enabled in response to a TACAN interrogation generator on the vehicle.

9. The system of claim 1 which further comprises:
a test transponder located at a known distance form each of the ground receive stations;
means for triggering the test transponder to transmit transponder signals;
in response to which transponder signals, the means for receiving the transponder signals at the ground receive stations determine time of arrival of the transponder signals and transmit the time of arrival information to the one of the ground receive stations; and
the one of the ground receive stations comprising means for determining calibration information for modifying subsequent time of arrival information from the ground receive stations.

10. The system of claim 9 wherein the triggering means enables the test transponder at a rate of one transmission per second.

11. A system for determining positions of a vehicle equipped with an IFF transponder and TACAN interrogation equipment comprising:
a squitter transmitter located on the vehicle;
enabling means, responsive to a TACAN interrogation pulse emitted by the TACAN interrogation equipment, for enabling the squitter transmitter at a predetermined time spacing interval after the enabling means responds to the TACAN interrogation pulse;
the squitter transmitter providing, when enabled, an interrogation signal, in response to which interrogating signal, the IFF transponder transmits a reply signal containing data specifying the altitude of the vehicle;
a plurality of spaced apart ground receive stations; each of which ground receive stations comprises means for:
 (a) receiving the TACAN interrogation pulse and the IFF transponder reply signal and decoding first identification information from the TACAN interrogation pulse,
 (b) determining a time of arrival of the TACAN interrogation pulse and the IFF transponder reply signal and the predetermined time spacing interval; and,
 (c) determining an identity of the vehicle by combining the first identification information with information derived from the predetermined time spacing interval;
a communications link connecting the ground receive stations with one of the ground receive stations; and
means, at the one of the ground receive stations, for receiving information from the other ground receive stations over the communication link, the information comprising the identity and time of arrival data determined from the time of arrival of the TACAN interrogation pulse and the IFF transponder reply signal, and for calculating from the time of arrival data the position of the vehicle.

12. The system of claim 11 comprising a message assembler at the other ones of the ground receive stations for compiling a message including a measured time of arrival and a decoded altitude signal, the message assembler connected to transmit the message over the communications link to the one of the ground receive stations.

13. The system of claim 12 wherein the enabling means is responsive to a single TACAN pulse frequency assigned to the vehicle.

14. The system of claim 13 wherein the receiving means of each ground receive station is capable of receiving a plurality of TACAN pulse frequencies and identifies vehicles by a received TACAN pulse frequency.

15. The system of claim 11 wherein the vehicle is an aircraft and wherein the system further comprises a disabling switch coupled to landing gear of the aircraft for disabling transmissions from the squitter transmitter when the aircraft is on the ground.

16. The system of claim 1 further comprises an accelerometer connected to the squitter transmitter for varying the rate of interrogation.

17. The system of claim 1 which further comprises means for generating a signal varying the rate of interrogation of the squitter transmitter.

18. The system of claim 17 wherein the means for generating a signal produces a signal related to performance of the vehicle.

* * * * *